(12) United States Patent  (10) Patent No.: US 6,445,455 B1
Hall et al.  (45) Date of Patent: Sep. 3, 2002

(54) PHASE AND INTENSITY MODULATED IFOG

(75) Inventors: John R. Hall, Woodland Hills; Daniel A. Tazartes, West Hills, both of CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 09/580,653

(22) Filed: May 23, 2000

(51) Int. Cl.[7] .............................................. G01C 19/72
(52) U.S. Cl. ...................................... 356/460; 356/466
(58) Field of Search ................................ 356/460, 464, 356/466; 385/14; 250/227.19, 227.27

(56) References Cited

U.S. PATENT DOCUMENTS

| | | | |
|---|---|---|---|
| 4,264,126 A | | 4/1981 | Sheem |
| 4,440,498 A | | 4/1984 | Sheem |
| 5,563,705 A | * | 10/1996 | Sanders ........................ 356/464 |
| 6,044,184 A | | 3/2000 | Shafer et al. |
| 6,046,810 A | * | 4/2000 | Sanders et al. .............. 356/464 |

OTHER PUBLICATIONS

Sheem, Sang K., "Optical Fiber Interferometers with (3×3) Directional Couples" Journal of Applied Physics 52, (b), Jun. 1981.

* cited by examiner

*Primary Examiner*—Samuel A. Turner
(74) *Attorney, Agent, or Firm*—Price and Gess (57) ABSTRACT

A phase and intensity modulated IFOG has a light source responsive to an intensity modulation signal for providing an intensity modulated light signal. A Sagnac interferometer has a fiber optic coil. The coil receives and circulates a clockwise and counter-clockwise beams. The Sagnac interferometer is responsive to an intensity modulated light signal at a first input port, and to a phase modulation signal at a phase modulation input terminal for outputting a non-reciprocal interference signal. A PSD detector system responds to the non-reciprocal interference signal and provides a demodulated bias signal. An intensity signal generator has an output that provides the intensity modulation signal. A phase signal generator provides the phase modulation signal to the phase modulation input terminal. The intensity signal generator and the phase signal generator have a common frequency. The phase difference $\theta$ between the phase modulation signal and the intensity modulation signal is adjustable in response to at least a first control signal. A computer with a digitizing sampler is coupled to receive and digitize successive sample values of the demodulated bias signal. The computer executes a program that adjusts the phase difference $\theta$ between the intensity modulation signal and the phase modulation signal to drive the amplitude of the sample values of the demodulated bias signals to a minimum. The computer program successively calculates and outputs an estimate of the input rotation rate about the Sagnac sensitive axis as a function of the phase angle $\theta$.

19 Claims, 6 Drawing Sheets

PHASE AND INTENSITY MODULATED IFOG

BACKGROUND OF THE INVENTION

This invention relates to the field of fiber optic gyros or interferometric fiber optic gyros, IFOGS and more particularly to the field of modulation systems and methods for such gyros. IFOGS operating in a closed loop arrangement typically use a serrodyne ramp modulation system and typically do not intentionally modulate the intensity of the light source driving the Y-coupler and fiber optic coil.

FIELD OF INVENTION

Each of the embodiments presented herein uses a combination of intensity modulation of the light source driving the Sagnac interferometer and a concurrent phase modulation of the light circulating in cw (clockwise) and ccw (counterclockwise) beams in the fiber optic coil. This innovative modulation arrangement will be seen to offer an alternative to the serrodyne modulation technique. A first embodiment of the invention uses an MIOC (multifunction integrated optics chip) depicted with a Y—Y or 2×2 coupler known in the field of multifunction integrated optics chips, such as those having integrated optic circuits formed on Lithium Niobate ($LiNbO_3$) substrates. Multiple functions are incorporated on a single device eliminating losses and errors associated with individual interface optical coupling.

A second embodiment eliminates the higher cost MIOC and the 2×2 coupler and substitutes therefore a combination using a lower cost 3×3 coupler and a PZT phase modulator and two extra detectors. Both topologies rely on a combination of light source intensity and optical phase modulation at a common frequency with angular rate being determined from the phase difference angle between the intensity modulation signal and the optical phase modulation signal.

SUMMARY

A first embodiment of the phase and intensity modulated IFOG comprises a light source that responds to an intensity modulation signal and provides an intensity modulated light signal. A Sagnac interferometer has a fiber optic coil of single mode fiber. The coil has a first and a second end, and receives and circulates a cw (clockwise) and a ccw (counter clockwise) beam. The coil has a sensitive axis that is normal to the plane of the coil. The interferometer responds to an intensity modulated light signal at a first input port, and a phase modulation signal at a phase modulation input terminal and outputs a non-reciprocal interference signal.

A PSD detector responds to the non-reciprocal interference signal and provides a demodulated bias signal. An intensity signal generator provides an intensity modulation signal at an output. A phase signal generator proves a phase modulation signal to the Sagnac interferometer phase modulation input terminal. The intensity signal generator and the phase signal generator have a common frequency. The phase difference θ between the phase modulation signal and the intensity modulation signal is adjusted in response to at least a first computer control signal.

A computer has digitizing sampler coupled to receive and digitize successive sample values of the demodulated bias signal. The computer executes a program characterized to adjust the first computer control signal to adjust the phase difference θ between the intensity modulation signal and the phase modulation signal to drive the amplitude of the sample values of the demodulated bias signals to a minimum. The computer program successively calculates and outputs the input rotation rate to the sensitive axis as a function of the phase angle θ between the intensity modulation signal and the phase modulation signal.

In a more particular embodiment of the phase and intensity modulated IFOG has an optical coupler that receives the intensity modulated light signal at a first port. The optical coupler has a second from which it sources intensity modulated light signal and into which it receives an optical non-reciprocal interference signal. The coupler has an output port from which it sources a portion of the optical non-reciprocal interference signal.

An MIOC (multifunction integrated optics circuit) is included that has an input port coupled to the optical coupler second port, and an input wave-guide coupled to the input port that extends to a junction at which it bifurcates into at least a first and a second output wave-guide. The first and second output wave-guides are coupled to the fiber optic coil first and a second end from which they launch respective cw and ccw beams. The first and second ends receive respective ccw and cw beams after the beams transition the coil. Electrode means comprising modulator plates are coupled to the phase modulation input terminal. The electrode means responds to the phase modulation signal by phase modulating the launched and received cw and ccw beams. The returning cw and ccw beams destructively combine at the junction to form the non-reciprocal interference signal. The non-reciprocal interference signal is coupled from the MIOC input port to the optical coupler second port.

In this more particular embodiment, the PSD system further comprises a detector coupled to the optical coupler output port to receive the portion of non-reciprocal interference signal and converts the optical non-reciprocal interference signal into a buffered composite error signal. A PSD detector synchronously detects the buffered composite error signal and outputs the demodulated bias signal.

In yet an even more particular first embodiment, a transit time signal generator provides a transit time modulation signal with a frequency equal to half the reciprocal of the transit time of the coil. An adder sums the transit time modulation signal and the phase modulation signal and outputs a composite phase modulation signal to the phase modulation input terminal. The phase modulation input terminal on the interferometer receives the composite phase modulation signal and modulates the launched and received cw and ccw beams. In an even more particular embodiment, the PSD comprises a detector system coupled to receive the non-reciprocal intensity, detect it and provide a composite error signal to a preamplifier. The pre-amplifier buffered the input composite error signal and provides a buffered composite error signal to a LPF (low-pass filter). The LPF filters the input signal and provided a buffered and filtered composite error signal to the PSD (phase sensitive detector). The PSD detector system is also driven by the transit time modulation signal and synchronously demodulates the buffered and filtered composite error signal formed from the non-reciprocal interference signal and outputs the demodulated bias signal to a digitizing sampler.

In a second embodiment, of the phase and intensity modulated IFOG, the Sagnac interferometer has a 3×3 coupler with first, second and third, fourth and fifth output ports, and an input port. The input port is coupled to receive the intensity-modulated light. The intensity modulated light is divided into first, second and third portions by the 3×3 coupler and output from the 3×3 coupler's first, second and third output ports. The first and second output ports are coupled to the first and second ends of the fiber optic coil to launch cw and ccw beams and receive respective ccw and cw low-level non-reciprocal interference signals.

The PSD detector system that responds to the non-reciprocal interference signal in the first embodiment further comprises a first second and third detector and pre-amplifier combination. The first detector and pre-amplifier are coupled to be responsive to the ccw non-reciprocal interference signal to provide a first buffered composite error signal. The second detector and pre-amplifier combination is responsive to the cw non-reciprocal interference signal for providing a second buffered composite error signal. Each detector and pre-amplifier also provides a respective filtered composite error signal.

A modulating means responds to the phase modulation signal by modulating the launched and received cw and ccw beams. The 3×3 coupler destructively combines the received ccw and cw beams to form first and second non-reciprocal interference signals and outputs a portion of the signals from the 3×3 coupler's fourth and fifth output ports. In a more particular embodiment, the modulation means further comprises a PZT fiber optic coil modulator with an input terminal coupled to be phase modulation signal for modulating the cw (clockwise) and a ccw (counter clockwise) beams.

In the more particular embodiment, the PSD detector system has a first LPF (low-pass filter) responsive to the first buffered composite error signal for providing a first buffered and filtered composite error signal. A first PSD (phase sensitive detector) responds to the first buffered and filtered composite error signal by providing a first demodulated bias signal. A second LPF responds to the second buffered composite error signal by providing a second buffered and filtered composite error signal. A second PSD responds to the second buffered and filtered composite error signal by providing a second demodulated bias signal. The digitizing sampler is coupled to receive and periodically digitize each first and second buffered and filtered composite error signal and each first and second filtered composite error signal, their respective values being coupled to the computer. The third detector and pre-amplifier are coupled to the 3×3 coupler's third output port to sample the intensity of the intensity modulated light source and provide a third filtered composite error signal. The digitizing sampler is coupled to receive and periodically digitize the third filtered composite error signal and provide a series of digitized third filtered composite error signals to the computer.

In a still more particular embodiment of the second embodiment o the IFOG, the computer program continues to repeat the routine of adjusting the angle θ to minimize the value of the difference between the first and second demodulated bias signals followed by the step of calculating the angular rate being sensed by the Sagnac Interferometer. The computer first calculates the value of the variable Pbias from the equation:

$P\text{bias} = 0.5 * \phi 0 * \epsilon * \cos(\theta) \text{Radians}$ where θ0 and ε are known constants. The computer then substitutes the value obtained for Pbias into the following equation to calculate the IFOG sensed rate input:

$$\frac{P\text{bias}}{SSF * 3600 * 1.0125} = \text{sensed rate input in deg/sec}$$

where SSF is a known constant.

DESCRIPTION OF THE PREFERRED EMBODIMENT

Figure 1:
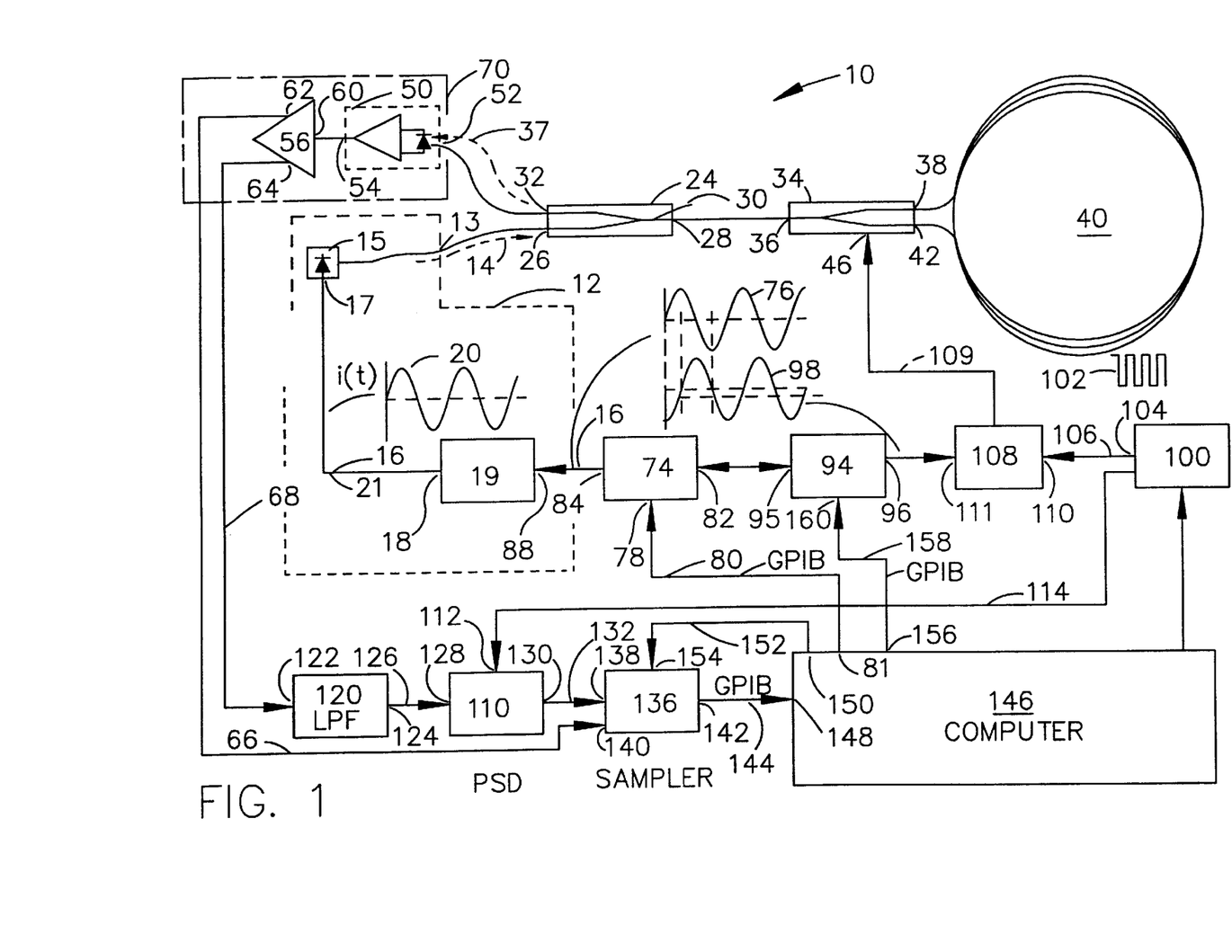
FIG. 1 is a schematic view of a first embodiment of a phase and intensity modulated IFOG using a 2×2 coupler; and an MIOC.

FIG. 1 is a schematic phase and intensity modulated IFOG 10 having a light source within phantom block 12 responsive to an intensity modulation signal, schematically characterized by waveform 76, for providing an intensity modulated light signal from an output port 13. Phantom ray 14 depicts the modulated light signal. The intensity modulation signal is received at input 88 from signal line 16. The low frequency intensity modulation signal modulates the intensity of the output light ray 14 by modulating the output of current source 19.

Figure 2:
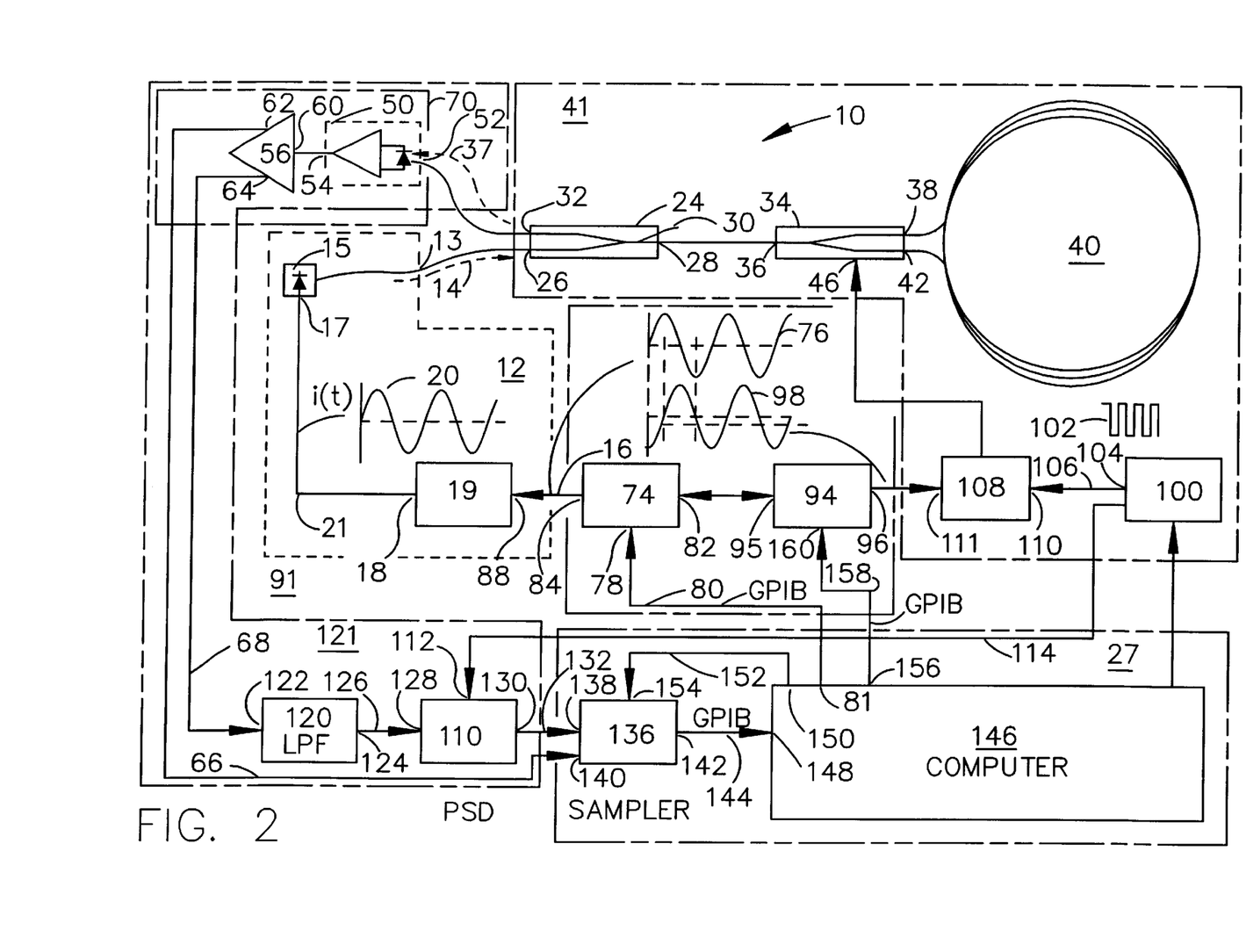
FIG. 2 is a schematic view of the first embodiment of the phase and intensity modulated IFOG of FIG. 1 with phantom blocks identifying functional groups.

Referring to FIG. 2, a Sagnac interferometer is shown within phantom block 41 has a fiber optic coil 40. The Sagnac interferometer comprises the coupler 26, the MIOC 34 and the optical loop, and when supplied by a light source, functions to provide an optical output signal containing a low level non-reciprocal interference signal in response to a rate input into the interferometer's sensitive axis.

The coil has a first and second end. The coil receives and circulates cw (clockwise) and ccw (counter clockwise) beams. The coil has a sensitive axis that is perpendicular to the plain of the coil. Optical coupler 24 is responsive to the intensity modulated light signal 14 from the light source output port 14 at a first port 26. The 2×2 coupler 24 also has a second port 28 for sourcing intensity modulated light signal and for receiving a non-reciprocal interference signal and an output port 32 for sourcing a portion of the non-reciprocal interference signal. Port 30 is not used.

A MIOC 34 (multi-function integrated optics circuit) 34 is shown having an input port 36 coupled to receive intensity-modulated light, from the 2×2 coupler first output port 28. A first output port 38 couples a cw (clockwise) light beam into the first end of a fiber optic coil 40. A second MIOC output port 42 couples a ccw (counter-clockwise) light beam into the second end of a fiber optic coil 40.

A modulation signal terminal 46 is connected to receive a composite modulation signal that is used by the MIOC to modulate light sourced from and to the MIOC's first and second output ports 38, 42 into the first and second ends of the fiber optic coil 40. Electrode means are well known in the field of MIOC design and typically comprise an arrangement of metal or conductive areas positioned on the surface of an MIOC substrate as to be parallel, astride and very close to the wave guides to be modulated. A phase modulation signal is applied to the metal electrodes so as to direct an electric field from one electrode to another, the electric field passing across the wave guide to be modulated thereby modifying the index of refraction of the wave guide as a function of the electro optic coefficient and the magnitude of the electric field created.

Electrodes for modulating light passing through wave guides in an MIOC are shown in references such as U.S. Pat. No. 6,044,184 which issued on Mar. 28, 2000, the contents of which are incorporated herein by reference. After circulating in the fiber optic coil, the cw and ccw beams return to the MIOC's second and first output ports 42, 38 respectively.

The composite modulation signal applied to the modulator imposes a phase shift on the respective cw and ccw beams. Additional phase shift is imposed on the beams as a result of the relativistic effect that accompanies any input rotation rate to the sensitive axis. The phase shifted cw and ccw beams combine in the MIOC and as a result of destructive interference, produce a low-level non-reciprocal interference signal.

A portion of the low-level non-reciprocal interference signal exits the MIOC at its output port 36. The low-level non-reciprocal interference signal is shown coupled to the coupler's first output port 28. A subsequent portion of the low-level non-reciprocal interference signal represented by phantom line 37 exits the coupler at the coupler's third output port 32 and is used to illuminate the sensor (typically a PIN diode) within detector 50.

A PSD system, is shown in FIG. 2 within phantom block 121 as comprising a detector system coupled to the optical coupler output 32, shown within phantom block 70, an LPF (low-pass filter) 120 and a PSD (phase sensitive demodulator) 110. The detector system 70 is shown as having a detector within phantom block 50 having a sensor at input port 52 coupled to a trans-conductance amplifier. The detector system is coupled to the optical coupler output port 32 to receive a portion of the non-reciprocal interference signal and to convert the non-reciprocal interference signal into a composite error signal at detector output 54.

Pre-amplifier 56 receives the composite error signal and outputs a buffered composite error signal at pre-amplifier output 64 and a filtered composite error signal at pre-amplifier output 62. Detector 50 responds to the low-level non-reciprocal interference signal by providing a composite error signal at its output 54. In the case of the topology of FIGS. 1 and 2, the interference signal at the detector input 52 is a composite low-level non-reciprocal interference signal because the modulation is a composite (a sum) of two distinct independent and un-synchronized waveforms.

The detector 50 converts the interference pattern of light from the non-reciprocal interference signal on its sensitive surface into a composite error signal at the detector output terminal 54. The pre-amplifier 56 receives the composite error signal and buffers it to provide a buffered composite error signal on signal line 68. The pre-amplifier filters and buffers the composite error signal to provide a filtered composite error signal on signal line 66. The filtered composite error signal on signal path 66 is a filtered voltage that is proportional to the average intensity. The buffered composite error signal on signal path 68 is a buffered unfiltered ac voltage level that is proportional to the instantaneous intensity of light on the detector. The intensity pattern shifts in response to the modulator drive signal.

As shown, pre-amplifier 56 has an input terminal 60, a first output terminal 62 and a second output terminal 64. The pre-amplifier 56 filter the composite error signal to provide a filtered composite error signal at its first output terminal 62 on signal line 66. The pre-amplifier's second output terminal 64 provides a buffered composite error signal on signal line 68 that is unfiltered. In an alternative embodiment, it should be possible to integrate the function of the pre-amplifier and the function of the detector into a single packaged device, which could be characterized as an integrated detector shown within phantom box 70. The function of the pre-amplifier is thus subsumed into that of the detector. The integrated detector then has a first and second output terminal for providing the filtered composite error signal at its first output terminal 62 and the buffered composite error signal at second output terminal 64.

Block 74 represents an intensity signal generator that provides an intensity modulation signal represented by waveform 76 at a low frequency, typically in the range of 1.0–10 KHz. The intensity signal generator 74 has an input bus connection 78 from a first GPIB digital bus 80 and a synchronization input terminal 82. The first GPIB digital buss 80 is connected to the first computer buss connection 81.

The intensity signal generator also has an output terminal 84 connected to a current source 19 at the current source input terminal 88. The current source 19 receives the low frequency intensity modulation signal at input terminal 88, buffers it and provides the modulated intensity drive signal I(t) 20 at its output terminal 18 on signal line 21 to the input terminal 17, the anode, of laser diode 15. The function of the current source 19 and the intensity signal generator 74 could be integrated into a single package or simulated within the computer, the required outputs being delivered from digital to analog converters.

Block 94 represents a phase signal generator 94 that provides a phase modulation signal at its output terminal 96. The phase signal generator 94 has a sync terminal 95 coupled to the sync terminal 82 of the intensity signal generator 74. The signal line between these terminals enables the phase signal generator to emit sync pulses from sync terminal 95 to sync terminal 82 to lock the frequency of the intensity signal generator 74 to the frequency of the phase signal generator 94.

The phase modulation signal, represented by waveform 98, has a low frequency equal to the frequency of the intensity modulation signal 20. Block 100 represents a transit time signal generator that provides a transit time modulation signal, represented schematically by waveform 102 out of its transit time signal generator output terminal 104 on signal line 106 to adder 108 at a first adder input terminal 110. The adder has a second adder input terminal 111. A portion of the transient time modulation signal 102 is conditioned, as required, to form a transit time reference signal which is coupled via signal line 114 to PSD (phase sensitive detector) 110 where it is received at the PSD transit time demodulation reference input terminal 112.

The adder 108 is typically an analog-summing amplifier that sums the low frequency phase modulation signal 98 and the transit time modulation signal 102. The sum of the two signals forms the composite modulation signal, which is coupled to the MIOC modulation signal terminal 46. The frequency of the transit time signal 102 is related to the transit time of the coil. The relationship is explained in references such as U.S. Pat. No. 4,705,399 to Graindorge et al issued Nov. 10, 1987.

Block 120 is typically a LPF (low-pass filter) with an input terminal coupled to receive the buffered composite error signal on signal line 68 at its input terminal 122. The filter has an output terminal 124 that outputs the buffered and filtered composite error signal via signal line 126 to the PSD demodulator input terminal 128. The filter 120 conditions the interference signal on signal line 68, as required, in preparation for demodulation by PSD 110. The PSD is a synchronous demodulator that is responsive to the buffered and filtered buffered composite error signal from signal line 68 via the filter 120 and to the transit time demodulator reference signal via signal line 114 for providing a demodulated bias signal at the PSD output terminal 130 onto signal line 132. In operation, the transit time reference signal chops the buffered and filtered composite error signal at the rate of the transit time demodulator reference signal making it possible to extract and if in a closed loop configuration, to selectively null out that component of the buffered composite error signal on signal line 68 that is produced by the transit time reference signal. The bandwidth of the system is enhanced because the transit time reference signal is typically over 100 times higher than the frequency of the phase signal generator 94.

Block 136 represents a sampler having a first input terminal 138, a second input terminal 140 and an output buss connection 142 to second GPIB buss 144. The sampler samples the demodulated bias signal at its input terminal 138 and the filtered composite error signal at its input terminal 140. The samples are digitized using an analog to digital converter. The digitized values of the two analog signals are output onto the second GPIB buss 144 to computer 146, a general-purpose computer. The second GPIB buss 144 connects to the second computer buss connection 148. The computer 146 outputs control signals from output port 150 onto signal lines 152 into the sampler input port 154 to control the sample rate and selection of samples of the digitized values of the demodulated bias signal and the demodulated filtered composite error signal for delivery to the first computer buss connection 148. The computer uses the digitized values of each respective signal in executing a program.

The computer program executes an algorithm in which the computer provides a first phase output signal to the phase signal generator 94 from computer output connection 156 to third computer GPIB buss connection 158 for connection to the phase signal generator buss input 160. The computer also delivers a second phase output signal from computer output 81 to first computer GPIB buss 80 for connection to the intensity signal generator 74 to adjust the phase angle theta, the phase angle between the low frequency intensity modulation signal and the low frequency phase modulation signal to null out the demodulated bias signal. The computer 146 also calculates and outputs the absolute angular rate as a function of the phase angle theta or the bias signal necessary to drive the phase angle theta to a minimum.

Figure 4:
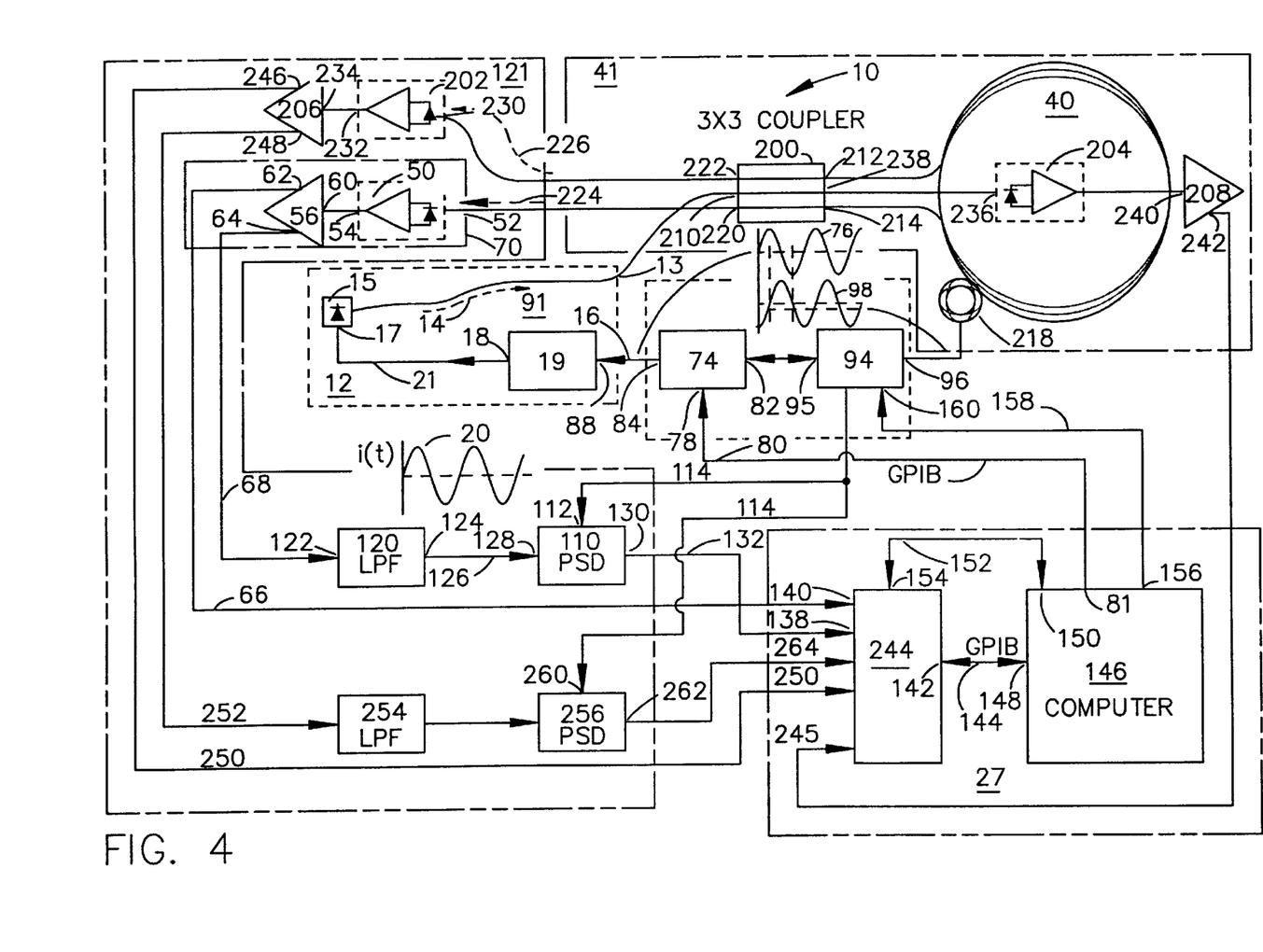
FIG. 4 is a schematic view of the second embodiment of the phase and intensity modulated IFOG of FIG. 3 with phantom blocks identifying functional groups.

FIG. 2 and FIG. 4 show alternative embodiments of a phase and intensity modulated IFOG in which phantom block 13 represent an intensity modulated light source. Phantom block 41 represents a Sagnac interferometer with at least a first input port 26 coupled to receive intensity-modulated light represented by ray 14. The Sagnac interferometer provides an optical output signal containing a low level non-reciprocal interference signal shown as ray 37 in response to a rate input into the interferometer's sensitive axis. Phantom block 121 represents a PSD (phase sensitive detector) detector system that amplifies, demodulates, and detects the non-reciprocal interference signal. Phantom block 27 represents a digitizing sampler 26 coupled to receive and periodically digitize the detected non-reciprocal interference signal and a computer means such as computer 146, for executing a computer program. The computer 40 has an input port coupled to receive each successive detected digitized non-reciprocal interference signal. Phantom block 91 represents an intensity signal generator that provides an intensity modulation signal having a low frequency with a phase signal generator providing a phase modulation signal having a low frequency equal to the frequency of the intensity modulation signal and a transit time signal generator providing a transit time modulation signal having a frequency equal to the transit time of the coil, and a transit time reference signal. The computer program is characterized to adjust the first and second computer control signals to drive the amplitude of the detected non-reciprocal interference signal to a minimum. The computer program calculates the input rate as a predetermined function of the phase angle between the first and second low frequency signals.

Figure 3:
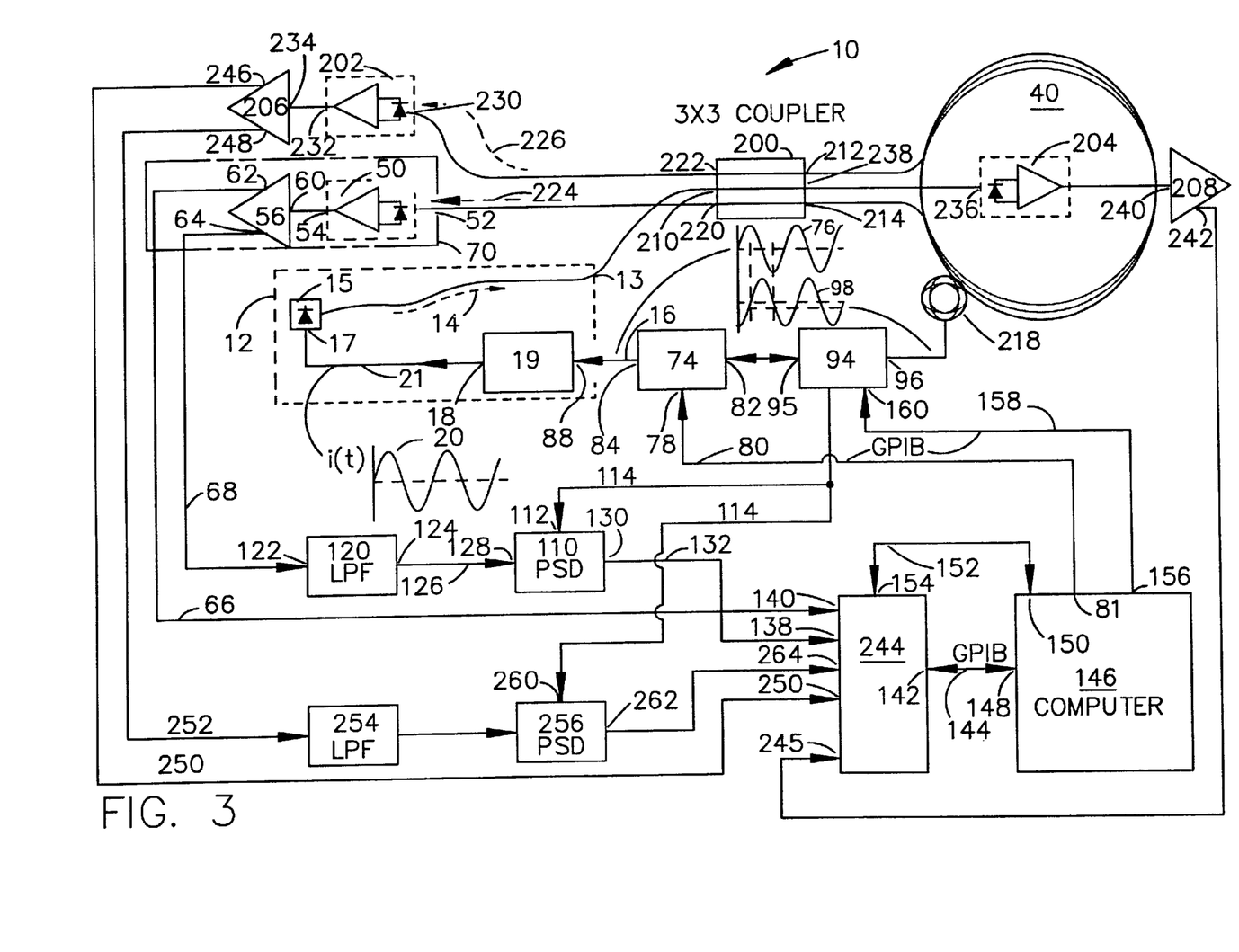
FIG. 3 is a schematic view of a second embodiment of a phase and intensity modulated IFOG using a 3×3 coupler.

In particular, FIG. 3 and FIG. 4 show an alternative embodiment of the invention phase and intensity modulated IFOG, which offers the possibility of lower cost of production. The alternative embodiment of FIG. 3 and FIG. 4 replace the 2×2 coupler 24, the MIOC 34, and the adder 108 of FIG. 1 and FIG. 2 with a 3×3 coupler 200, a second detector 202 and a second pre-amplifier 206 are added. The 3×3 coupler has a first output port 212, a second output port 214, a third output port 220, a fourth output port 222, a fifth output port 238, and an input port 210. The input port 210 is coupled to receive intensity modulated light represented by ray 14 from light source 12. The intensity modulated light is divided into first, second and third portions by the 3×3 coupler and output from the 3×3 coupler's first, second and third output ports. The first and second output ports 212, 214 are coupled to respective fiber optic coil first and second ends to launch cw and ccw beams and receive respective ccw and cw non-reciprocal interference signals.

The PSD detector system of FIGS. 3 and 4 is represented by phantom block 121. The PSD detector system 121 is coupled to the 3×3 coupler's third and fourth output ports 220, 222 to receive the cw and ccw non-reciprocal interference signals, and for providing a first and a second demodulated bias signal. The PSD detector system has a first detector 50 and pre-amplifier 56 and a second detector 202 and a second pre-amplifier 206. The first detector 50 and pre-amplifier 56 are coupled to the 3×3 coupler's third output port to receive the cw non-reciprocal interference signal and to output a first buffered composite error signal on signal line 68. The second detector 202 and the second pre-amplifier 206 are coupled to the 3×3 coupler's fourth output port to receive the ccw non-reciprocal interference signal and to output a second buffered composite error signal on signal line 252. Each detector and pre-amplifier also provide a respective filtered composite error signal on signal lines 66 and 250 respectively.

A third detector 204 and a third pre-amplifier 208 are added to sample the intensity of the intensity modulated light source at the 3×3 coupler's third output and provide a third filtered composite error signal from the third pre-amplifier's output 242. The digitizing sampler 244 is coupled to receive and periodically digitize the third filtered composite error signal at sampler input 245 and provides a series of digitized third filtered composite error signals to the computer 146.

The 3×3 coupler 200 has a first input port 210 coupled to receive intensity-modulated light represented by ray 14. In lower cost applications, the light source 12 is typically a broadband laser diode such as an ELED or SLD. Broadband erbium doped fiber sources or super fluorescent sources have not been identified as a preferred light source because it is believed that such a source would be bandwidth limited at a lower frequency than would be the case with an ELED. However, there may be applications for a gyro of this invention type where bandwidth response might not be critical. In such applications, use of a broadband-doped source might be reconsidered.

Intensity modulated light is divided by the 3×3 coupler 200 and coupled into the loop's first and second ends via the 3×3 coupler's first and second output ports 212, 214 to form a cw (clock-wise) beam and a ccw (counter-clockwise) beam. The Sagnac interferometer comprises the fiber optic loop 40, the 3×3 coupler 200 and PZT 218. PZT 218 functions as a modulating means responsive to the phase modulation signal for modulating the launched and received ccw and cw beams to form first and second non-reciprocal interference signals and for outputting a portion of the first and second non-reciprocal interference signals from the fourth and fifth output ports 220, 222. The PZT forms a bobbin on which a number of turns of fiber that makes up the coil are wound. The bobbin is expanded slightly by operation of a PZT transducer. The phase modulation signal is shown schematically as waveform 98 from the phase modulator output 96. The Sagnac interferometer provides a first and second output signal, each containing a low level non-reciprocal interference signal out of the 3×3 coupler's third and forth output ports 220, 222 in response to a rate input into the interferometer's sensitive axis. The non-reciprocal interference signals contain regions of high and low intensity that are detectable by a photo-detector. The amplitude of the low level non-reciprocal interference signals nulls when the phase angle between the phase modulation signal and the intensity modulation signal are adjusted to accommodate the rate input to the sensitive axis. The first and second low level non-reciprocal interference signals represented by rays 224, 226 out of the 3×3 coupler are coupled to the first and second detectors 50, 202 at their respective input ports 52, 230.

The embodiments of FIG. 3 and FIG. 4 have a first, second and third detector 50, 202, 204. The first detector 50 is coupled to be responsive to a clockwise non-reciprocal interference signal, such as that represented by ray 224. The second detector 202 is coupled to be responsive to the counter-clockwise non-reciprocal interference signal such as that represented by ray 226. In the embodiment of FIGS. 3 and 4, the output of the first detector 54 is connected to the input 60 of the first pre-amplifier 56 and the output of the second detector 232 is connected to the input of the second pre-amplifier 234. The input port 236 of the third detector 204 is coupled to sample or receive light from the 3×3 coupler's third output port 238. The third detector's output 238 is coupled to the third pre-amplifier's input 240. The third pre-amplifier's filtered output 242 is coupled to sampler input 245. The third pre-amplifier 208 receives the detected output, a third composite error signal, from third detector 204 at its input 240, filters the third composite error signal and provides a third filtered composite error signal to sampler input 245. The sampler receives and periodically digitizes the third filtered composite error signal of the intensity modulated light source and provides a series of average intensity signals to the computer.

As shown, the second pre-amplifier 206 has a first output terminal 246 and a second output terminal 248. The pre-amplifier filters the second composite error signal to provide a second filtered composite error signal at its first output terminal 246 on signal line 250. The second pre-amplifier's second output terminal 248 provides a second buffered composite error signal on signal line 252. In an alternative embodiment, it should be possible to integrate the function of the first and second pre-amplifier and the function of the first and second detector into one or more single packages which could be characterized as an integrated detector such as that shown within phantom box 70. The function of the pre-amplifiers would thus be subsumed into that of the one or more detector packages. An integrated detector package might then have a first and second output terminal for providing first and second filtered composite error signals at its first output terminal 62 and 246 and first and second buffered composite error signal at first and second output terminals 64 and 248.

As with the embodiments of FIG. 1 and FIG. 2, the computer program executes an algorithm in which the computer provides a first phase output signal to the phase signal generator 94 from computer output connection 156 to third computer GPIB buss 158 for connection to the phase signal generator buss input 160. The computer also delivers a second phase output signal from computer output 81 to first computer GPIB buss 80 for connection to the intensity signal generator 74 to adjust the phase angle theta, the phase angle between the intensity modulation signal and the phase modulation signal to null out the first and second demodulated bias signals. The computer 146 also calculates and outputs the absolute angular rate as a function of the phase angle theta.

The operation of LPF (low-pass filter) 254 and PSD 256 is identical in character and function to that of previously explained in connection with FIGS. 1 and 2 for the operation and function of LPF 120 and PSD 110 with the exception that the phase modulation signal 98 is conditioned, as required, to form a phase modulation demodulator reference signal which is coupled via signal line 114 to PSD (phase sensitive detector) 110 where it is received at the first PSD demodulation reference input terminal 112 and to the second PSD demodulation reference input terminal 260.

The PSD detector system 121 of FIGS. 3 and 4 further comprises a first LPF (low-pass filter) 120 responsive to the first buffered composite error signal for providing a first buffered and filtered composite error signal. A first PSD (phase sensitive detector) 110 is responsive to the first buffered and filtered composite error signal on signal line 126 for providing a first demodulated bias signal on signal line 132. A second LPF (low-pass filter) 254 is responsive to the second buffered composite error signal on signal line 252 for providing a second buffered and filtered composite error signal to the input of the second PSD (phase sensitive detector) 256 responsive to the second buffered and filtered composite error signal for providing a second demodulated bias signal to sampler input 264.

The digitizing sampler 244 is coupled to receive and periodically digitize each first and second demodulated bias signal and each first and second filtered composite error signal, and couple their respective values to the computer.

The first and second PSDs 110, 256 are synchronous demodulators that are responsive to respective buffered and filtered composite error signals from signal line 68 via the filter 120 and signal line 250 via filter 254 and to the phase modulation demodulator reference signal via signal line 114 for providing a first demodulated bias signal at the first PSD output terminal 130 onto signal line 132. A second demodulated bias signal is provided at the second PSD output terminal 262 onto signal line 264. The buffered and filtered composite error signals are demodulated and integrated within each respective PSD to form first and second demodulated bias signals which are coupled to first and second sampler inputs 138, 264. The digitizing sampler 244 is coupled to receive and periodically digitize each of the demodulated bias signals that result from the first and second non-reciprocal interference signals. The sampler 244 outputs the digitized sampled values from its output 142 to the second GPIB buss 144 to the computer's first buss input 148 for use by the computer program. In operation, the transit phase modulation demodulator reference signal chops the first and second buffered and filtered composite error signals at the frequency of the phase modulation signal to extract information at the phase modulation frequency.

FIG. 1 shows an embodiment of the invention phase and intensity modulated IFOG 10 that was reduced to practice using laboratory test equipment. The ac buffered composite error signal from pre-amp output 64 is coupled to input 122 of box 120, representing an ITHACO 4234, an off the shelf band-pass filter. The high and low bandwidth limits of the band pass filter are adjusted manually using the 4234 to obtain best results. A fiber optic coil was wound from a 200-meter length of single mode optical fiber. A high frequency modulation drive signal referred to as the transit time demodulator reference signal comprising a square wave at 500 KHz, is depicted as wave form 102, and is supplied by signal generator 100, an HP 3325 function generator, from its output 104 via signal path 106 to the first input 110 of summer 108. The output of the summer 108 is coupled via signal path 109 to drive the MIOC modulation drive terminal 46.

The output of the 4234 filter 120 was fed via signal path 126 to the input of an EG&G Lock-in Amplifier 110, a model 5202 which performed the PSD function.

A demodulation reference drive signal was provided to the EG&G from the modulator drive output of the transit time signal generator, an HP3325 Function Generator represented by block 100. A second HP3325 was used for the phase signal generator shown as block 94. The output of the EG&G Lock-in Amplifier 22 is a slowly varying control level which is proportional to the total intensity modulated non-reciprocal phase shift in the interferometer.

Open-Loop Operation

In open-loop operation, the phase angle difference, between the phase modulation signal operating at low frequency and the intensity modulation signal operating at the same low frequency is fixed. With the phase difference fixed between the outputs of the two signal generators 74, and 94, the gyro is uncontrolled and the output of the PSD will rise with an increase in input rate and decrease with a fall in input rate. The output of the PSD will not be of use in calculating the input rate.

Closed-Loop Operation

In a closed-loop arrangement, or implementation, the phase angle difference between the intensity modulation and the phase modulation (both at relatively low frequency) is adjusted by an active servo to minimize the detected output from the PSD at its output 130. A separate function generator is required for the intensity modulation signal 76 and the phase modulation signal 98 so that the phase difference between each may be adjusted. The angular rate is then derived from the following equation:

$$\text{Angular Rate} = -0.5 * phi0 * epsilon * \cos(theta) \quad (1)$$

Where:
phi0 is the phase modulation at low frequency in radians,
epsilon is the intensity-modulated fraction of I0,
theta is the phase difference between the phase modulation signal and the intensity modulation signal.

During the reduction to practice, the integrated output of the PSD on signal line 132 was fed to the input of an HP3421, a Scanner DMM, which operates as a digital multi-meter to capture and digitize the value of the signals as with an A-to-D converter. The scanner selects the signal on either line 132 or 66, makes the measurement and then outputs the value onto the second GPIB (General Purpose Interface Bus) digital buss 144. The GPIB buss is an industry standard for interfacing test equipment with computers. The scanner operates as a multiplexer in framing the values for export to the computer 40. The sampling may not be 1 for 1. The computer used was a personal computer. The sampling rate used was once per second on signal line 132.

A third HP3325 function Generator is used as intensity signal generator 74 to generate the intensity modulation signal, depicted above block 74 as sinusoidal curve 76, that is used to modulate the intensity of the light source 12 via signal conditioner or current source 19. Light source 12 is powered by a laser diode power supply made by ILX Lightwave Technologies. A sinusoidal waveform was actually used for the intensity and phase modulation signals; however, it may be possible to use waveforms with other shapes such as triangular wave shapes. Input terminals 82, 95 of the two signal generators, or synthesizers 74, 94 are connected together to synchronize the respective time base in each. Synchronization is also achieved in the alternative via GPIB buses 80 and 158.

The interferometer of FIGS. 1 and 2 is biased off at + or −π/2 get maximum sensitivity and to resolve the ambiguity in rotation direction. In practice, modulator 100 provides a square wave drive that is symmetrical around zero, to provide for switching back and forth between both sides of the interferometer's bias curve. In reduction to practice, a square wave at 500 KHz was used. The square wave had a step height adjusted to obtain +/−π/2 radians of phase shift. Typical modulators require a 2–5 volt voltage swing. Adder 108 sums the drive signal with the phase modulation signal to form the composite modulation signal.

A detectable real rate input will provide an observable square wave signal component at the detector output 54. In the case of FIG. 1, the square wave signal component can be biased to a minimum by adjusting the phase relationship between the phase modulation signal 98 and the intensity modulation signal 76. A knowledge of the amplitude of the two driving signals and knowledge of the frequency and phase difference between them provides enough information for the calculation of the input rate when a null condition exists at the output of the PSD 110. The square wave error signal at 54 and 110 go to a minimum.

An analysis of the bias calculation for a closed-loop equivalent to the systems of FIGS. 1–4 follows. The equations are listed herein as a first and second set, the first set of equations (1-1, 1-2, . . . 1-n) shows the computation of Pbias (predicted bias) for the topology of FIG. 1 using a rate input Ω=10 degrees per second. A second set of equations (2-1, 2-1, . . . 2-n) follows the first and shows the computation of Pbias for the topology of FIG. 3 with a rate input of 10 degrees per second. The results of the calculation of a single gyro bias for each topology were performed using MathCad 8.

The Predicted Bias value is calculated for the topology of FIG. 1 input when the simulated phase relationship of angle theta between the phase modulation signal of waveform 98 and the intensity modulation signal of waveform 76 is adjusted to drive the demodulated bias signal at the phase detector output 130 to a minimum.

The Predicted Bias value is calculated using the second set of equations for the topology of FIG. 3. The simulated phase relationship of angle theta between the phase modulation signal of waveform 98 and the intensity modulation signal of waveform 76 was adjusted to drive the error signal characterized as the difference between a first demodulated bias signal at the phase detector output 130 and a second demodulated bias signal at the output of phase detector 262 to a minimum.

A Quick Basic Program was written and is included in an Appendix to this application. The program is a slope chasing algorithm that closes the loop by iteratively adjusting the phase difference theta (θ) between the phase and intensity modulation signals so as to drive the error signal at the PSD outputs to a minimum. The system modeled by the equations has a range limit. Sensitivity is reduced as rate increases. The error signal is calculated as the difference between the sampled values of the first and second demodulated bias signals by the computer as the respective sample values are processed through sampler 244 to the second GPIB at computer input 148.

The algorithm used is found in the APPENDIX and the routine is called the "Find Theta" routine. Dtheta sets the step size for the search. Old Error initially has a large value. Dtheta increments Theta and a new Old Error are calculated that is hopefully smaller than that the previous value of Old Error. If that is the case, Dtheta increments the value of Theta in the same direction and the process is repeated. If the bias error decreases, Dtheta continues to increment in the same direction. If the bias error starts to increase, the increment size is divided in half and the sign of Dtheta is reversed until the process continues to switch direction signaling that a value of Theta has been found that nulls out the Error signal. The algorithm used was reduced to practice and tested using laboratory test equipment.

Figure 5:
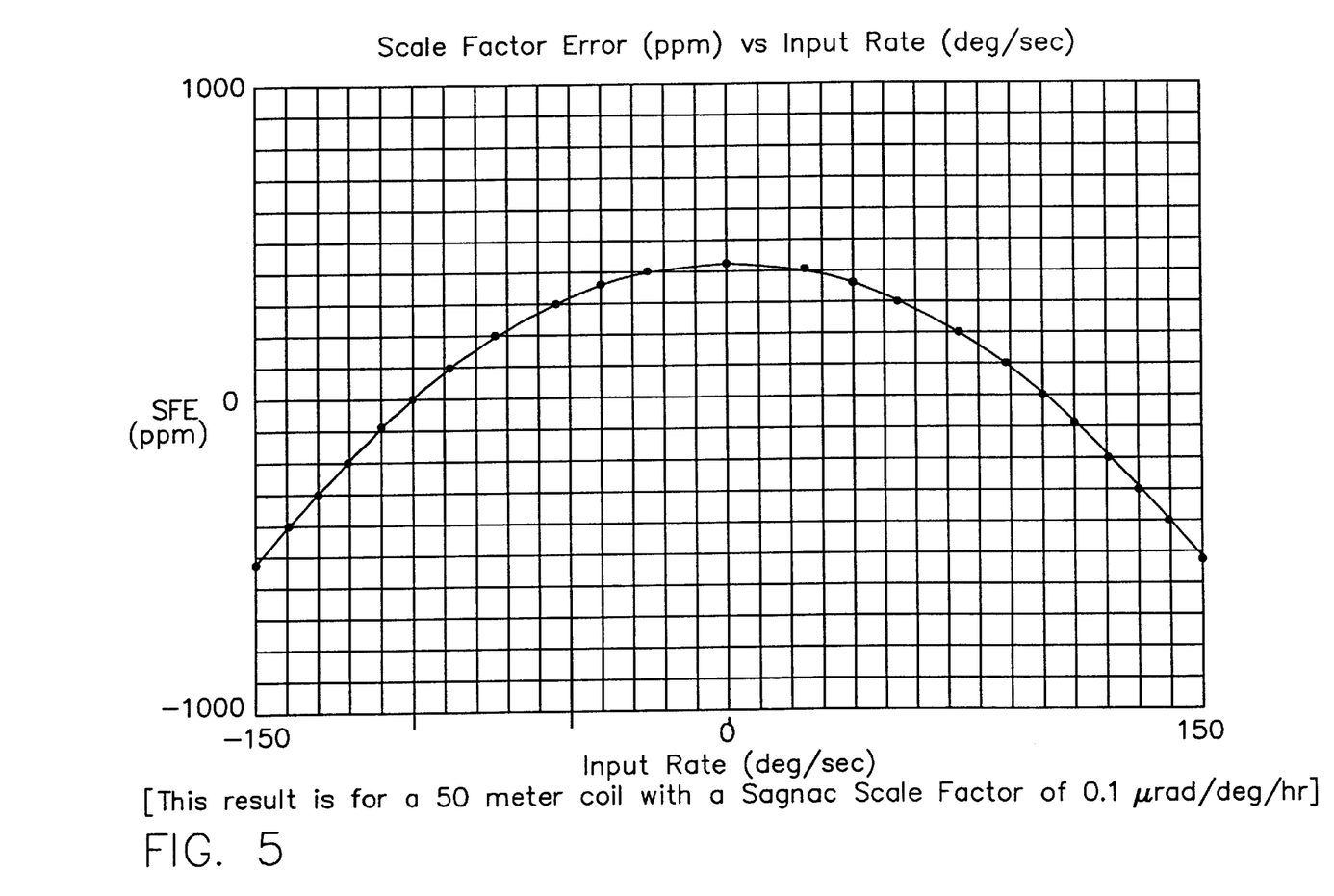
FIG. 5 is a graph of SFE (Scale Factor Error) as a function of Input Angular Rate for a 50-meter coil.
Figure 6:
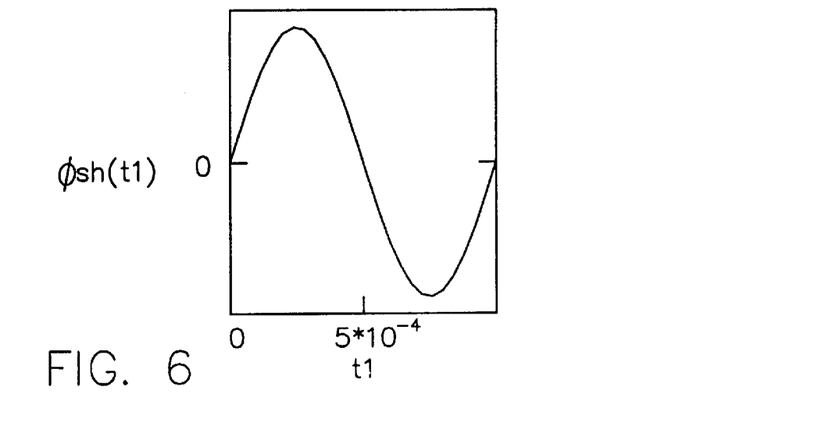
FIG. 6 is a graph of the low frequency phase modulation signal (variable ψsh(t1)) as a function of time as it might appear at the output of the phase signal generator 94 in FIG. 1 and depicted schematically as waveform 98 thereon.
Figure 7:
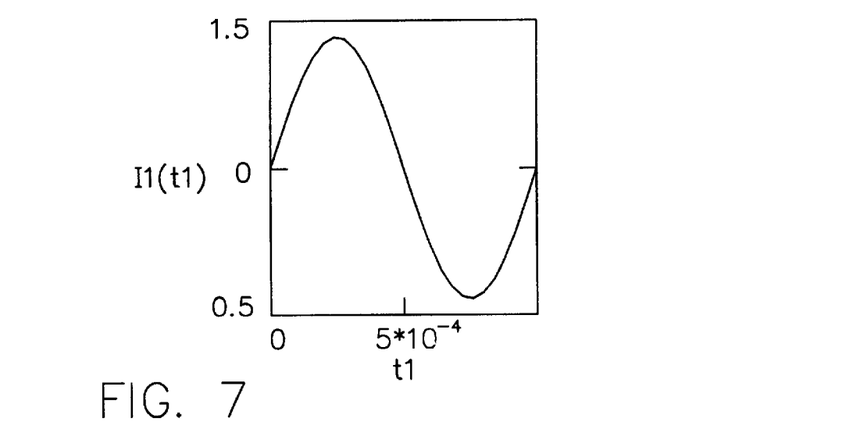
FIG. 7 is a graph of the low frequency intensity modulation signal (variable I1(t1)) as a function of time as it might appear at the output of the intensity signal generator 74 and depicted as waveform 76 thereon.
Figure 8:
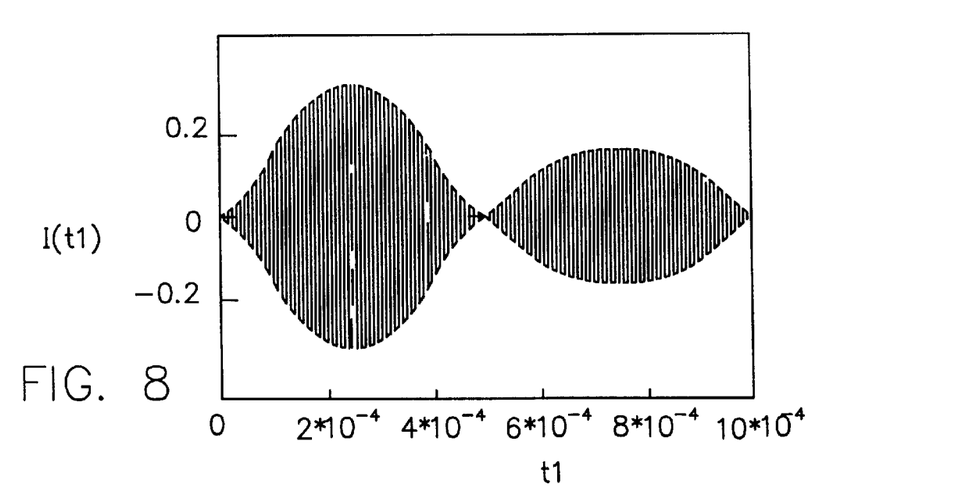
FIG. 8 is a graph of the intensity signal variable I(t1) as a function of time as it might appear on the photo detector 52 in FIG. 1.

FIG. 5 is a graph of the scale factor error of the modeled system in parts per million as a function of input rate over the range of input rate extending from −150 to +150 degrees per second. The curve can be moved up or down, by adjusting the value of the variable Fudge used in the Pbias calculation, so as to obtain a minimum scale factor error at a zero rate input with an increase in scale factor error at other points on the curve.

Data points on the curve are obtained by inserting a sequence of angular rate inputs Ωn into the equation, each Ωn leading to a value of Bias. The phase difference angle θn is then adjusted for each rate input to obtain a minimum Bias value. Each respective phase difference angle θn thus obtained is then inserted into the equation for Pbias. The computation of Pbias results in an idealized computed rate output (Pbias) for the phase difference angle θn corresponding to the input rate Ωn used to calculate the value of Bias in the closed-loop solution. The difference between the value of the actual rate input Ωn used in the Bias computation and the value of Pbias for each angle θn corresponding to each actual rate input provides the points on the scale factor error curve of FIG. 5.

The following equations show how the expression for Pbias was developed for the topology of FIGS. 1 and 2 for an absolute rate input Ω=10 degrees/second. The first group of equations below was used in the simulation of an open-loop FOG to show that rate information could be obtained using an intensity modulation signal and a phase modulation signal as inputs for the FOG topology of FIGS. 1 and 2 using a 2×2 coupler.

Equation (1-1) below provides a value for the variable ε, the intensity modulation fraction. The intensity modulation fraction characterizes the depth of modulation of the light level out of the light source 12 as being set to about 0.40.

$$\epsilon = 0.40 \quad (1\text{-}1)$$

Equation (1-2) below defines ψ0 (phi0), the amplitude of the phase modulation out of phase modulator 94 in radians with respect to the output of the intensity modulator 74. The amplitude of ψ0 controls the depth of phase modulation of the light waves passing through the MIOC as a result of the sinusoidal waveform into the adder 108.

$$\phi 0 = \pi/10 \quad (1\text{-}2)$$

phase mod difference signal in radians

Equation (1-3) below defines f, the frequency of the phase modulator output 96 and the frequency of the intensity modulator output 84.

$$f = 1000 \text{ Hz} \quad (1\text{-}3)$$

Frequency of Intensity Modulation and Phase Modulation

Equation (1-4) below defines the initial value of θ (theta), the phase angle between the phase modulator output and the intensity modulator output multiplied by the constant π. The value of the difference angle can be initially zero and can increase in a positive or negative direction as the modeled gyro operates. In the closed loop system, the value of θ is adjusted using a down hill or slope chasing servo to null out the demodulated bias signal on signal line 132 into sampler 136. The value of θ obtained is then used to calculate the rate input. The initial value of 0.0 shown below is increased or decreased as required to obtain a null with successive iterations.

$$\theta = 0.518021 * \pi \quad (1\text{-}4)$$

Relative phase between the Intensity Modulation and the Phase Modulation when adjusted to null out the error value given below. The value of 0.518021*π is equal to about 92.24378 degrees for this example using a rate input of 10 deg/sec.

Equation (1-5) below defines the launch intensity out of light out of the light source 12.

$$I0 = 1.0 \quad (1\text{-}5)$$

Launch intensity of the light source

Equation (1-6) below defines I1(t), the intensity modulation function for modulating the intensity of light launched from the BFS, where f, I0, ε, π, and f are constants and 't' is the only independent variable.

$$I1(t) = I0 * (1 + \epsilon * \sin(2*\pi*f*t)) \quad (1\text{-}6)$$

Intensity mod function

Equation (1-7) below defines the variable ψsh(t) that characterizes the non-reciprocal phase signal in the cw and ccw beams as they pass back through the MIOC.

$$\phi sh(t) = \phi 0 * \sin(2*\pi*f*t + \theta) \quad (1\text{-}7)$$

AC Phase Modulation Function

Equation (1-8) below defines the variable τ as the transit time for the coil light to pass in one end of the coil and out the other. The coil has a 50-meter length.

$$\tau = 0.25 * 10^{-6} \text{ seconds} \quad (1\text{-}8)$$

SSF (the Sagnac scale factor) is defined below by equation (1-9) SSF relates the input rotation rate to the amount of phase shift that is seen between the counter propagating light waves in the coil. For example, if a 50 meter coil is rotated with a rate of one degree per hour, and if the gyro has an SSF of 0.1*10^-6 rad/deg/hr, the rate will produce a phase shift between the cw and the ccw waves of 0.1 micro radian. Small phase shifts from small rotation rates serve to illustrate why an interferometer is needed to measure it.

The SSF for a FOG coil in general is $=2*\pi*L*D/\lambda*c$ where L is the coil length in meters, D is the effective or average diameter of the coil, $\lambda$ (lambda) is the wavelength which in this case is 1560 nanometers or 1.56 microns and c is the speed of light which is $3*10^8$ meters/second.

$$SSF = 0.1*10^{-6} \text{ rad/deg/hr} \tag{1-9}$$

Transit time & Sagnac Scale Factor for an approximately 50-meter coil

Equation (1-10) below defines $\Omega$, the input rate to the IFOG. The input rate is delivered to the gyro by positioning the gyro on a rate table. An actual earth rate of zero can be input to the gyro by pointing the sensitive axis of the gyro true east or west.

$$\Omega = 10.0 \text{ deg/sec} \tag{1-10}$$

Real or absolute inertial input rotation rate

Equation (1-11) below defines $\psi s$ where $\psi s$ is the phase shift that develops between the counter-propagating light waves due to the input rate $\Omega$. The factor of 3600 converts the result from degrees per second to degrees per hour. The result has the dimension of radians.

$$\phi s = \Omega * 3600 * SSF \text{ radians} \tag{1-11}$$

Resulting phase shift

Equation (1-12) below defines the variable Md where Md is the modulation depth for the square wave drive on signal line 109 to the modulator plates in MIOC 34 at 500 KHz. Md is adjusted in voltage swing to induce a phase shift of $+/-\pi/2$ radians.

$$Md = \pi/2 \tag{1-12}$$

Equation (1-13) below for $\psi m(t)$ is the equation for modulation depth and the function for a square wave bias. The $\Phi$ term is called the Heaviside step function, which is equal to 1 if the argument is greater than zero and zero if the argument is zero. The step function is built into MathCad. The value toggles between 0 and +1 depending on whether its argument is zero or non-zero. The argument is inside of the brackets. ($\tau$-mod( )). 'mod ( )' is another MathCad built in function. It's the modulo function. MathCad defines it as returning the remainder on dividing t by $2*\tau$. The result is either zero or two. '$\tau$' is the transit time. The time t is the actual independent variable time from initialization and start. The increment in time t used for each iteration is a tenth of a microsecond as defined by t1.

$$\phi m(t) = Md*(1-2*\Phi(\tau-\text{mod}(t,2*\tau))) \tag{1-13}$$

Equation (1-14) below defines I(t), the interferometer equation. The $\psi s$ term defined above as equation (1-11) introduces phase shift as a result of rotation rate input. As we change the rotation rate $\Omega$ into the gyro, the phase shift between the cw and ccw waves changes. The $\psi m(t)$ term (equation (1-13)) is the modulation that is being applied. The modulation is the square wave that is introducing the switched $+/-\pi/2$ phase modulation terms as time progresses and as the 500 KHz modulation continues.

$$I(t) := I1(t) \cdot \frac{((1 + \cos(\phi s + \phi m(t) + \phi sh(t))) - 1)}{(2)} \tag{1-14}$$

The $\psi sh(t)$ term within the argument is defined above as equation (1-7). Recall that the basic form for the modulation of an IFOG is $I = Io(1+\cos\theta)/2$ which has a value that increases to 1 and decreases to zero but is always equal to or greater than zero with an average value of 1.0. In equation (1-14) above, a $-1$ term is inserted to subtract out the dc term. The $-1$ constant inside of the bracket, allows the resulting expression swing between $+/-1$ which makes integration easier.

Equation (1-15) below is a MathCad expression that establishes t1 as a range variable. Each time the variable t1 is used, the program will evaluate the function and obtain a result for consecutive values of t1 beginning with t1=0, then t1=1*10^-6, 2*10^-6, . . . and concluding with 1*10^-6/1000. The variable f in the denominator was defined as the constant 1000.

$$t1 \ldots 0, 0.1 \cdot 10^{-6} \ldots \frac{1}{f \cdot \sec} \tag{1-15}$$

Equation (1-16) below defines Id(t) the demodulated intensity error signal using the square wave bias drive for the $\psi m(t)$ function. Id(t) characterizes the demodulated bias signal of the PSD 110 at terminal 130. The PSD function was provided by an EG&G 5202 Lock-in Amplifier. The synchronous drive or 500 KHz demodulation reference signal on signal line 114 drives the PSD. The information on output on signal line 132 is the demodulated bias signal Id(t) or that component of it that has a 500 KHz rep rate. It is the output of the PSD (phase sensitive demodulator) before integration. Multiplying I(t) by $\psi m(t)$ ping pongs the phase-shifted light exiting the MIOC back and forth across the cosine curve.

$$Id(t) = I(t)*\phi m(t) \tag{1-16}$$

Equation (1-17) below defines the variable 'm' which obtains the number of $\tau$ periods in two half cycle periods (0.001 sec) of the phase modulator output 96 which works out to be 40 periods for the coil used. The variable m is therefore the number of square wave 0.25 us (microseconds) periods over which the integration will span.

Equation (1-18) below defines the variable 'Bias' which is the gyro bias signal.

$$Bias = \frac{\int_0^{m*\tau} Id(t)*dt}{10*m*\tau} \text{ deg/per hr} \tag{1-18}$$

This Bias signal is proportional to the output of the integrator at signal line 132, and represents the demodulated intensity averaged over two sine wave cycles. The integration is performed over the range of from zero to m*$\tau$. The average of the result is then obtained by dividing by m*$\tau$, to get the average height of the Id(t) term over one full cycle at one kilohertz. The result obtained is a normalized value, which has units of intensity times time, which is then divided by intensity, and time. The output of the PSD 110 is sampled by sampler 136 and provided to the computer on second GPIB buss 144 for use as an error signal in the closed-loop implementation of FIGS. 1–4. The error signal out of PSD 110 is adjusted to a minimum by adjusting theta ($\theta$)□as previously described.

Equation (1-19) below is equivalent to 1-18 except that it is scaled from degrees per hour to degrees per second by dividing by 1/3600

$$\text{Measured Bias} = 8.960527 \cdot 10^{-8} \text{ degrees/sec} \quad (1\text{-}19)$$

The calculated and evaluated Bias approximates a null at $8.960527 \cdot 10^{-8}$ for a rate input of 10 degrees per hour when the value of theta in equation (1-4) is adjusted to:

$$\theta = 0.518021 \cdot \pi$$

Equation (1-21) below defines Pbias, which is the theoretical or actual bias that results from a given θ in an IFOG. Pbias is determined from the following equation, the derivation of which is not shown:

$$P\text{bias} = 0.5 \cdot \phi 0 \cdot \epsilon \cdot \cos(\theta) \text{ radians} \quad (1\text{-}21)$$

Substituting the value obtained for Pbias into equation (1-22) below solves for the calculated gyro rate
Scaled calculated output rate $$\frac{P\text{bias}}{SSF \cdot 3600 \cdot 1.0125} = 9.995398 \text{ deg/sec} \quad (1\text{-}22)$$

Recall that an input of Ω=10.0 deg/sec was used above in equation (1-10). The difference between the rate input of 10 deg/sec and the rate calculated from the value of θ obtained from the modeled topology of FIG. 1 via equations (1-1) to (1-19) provide the error for the system of FIG. 1. As discussed above, Quick basic was used to develop the error curve as a function of rate input as shown in FIG. 5. The program was written to drive the error to a minimum over range of rate inputs. The calibration constant was adjusted to move the vertical position of the curve to a position that was centered on zero.

Pbias is the closed loop Predicted Bias. Each of the terms in the equation is known. In a closed loop system, the variable θ is iterated as described above. As θ varies, the Predicted Bias varies. A slope-chasing algorithm was developed in the quick basic version that adjusted the value of θ phase angle to drive the value of the Bias signal out of the lock-in to a null value.

Bias is the error signal out of the PSD 10 on signal line 132. If the control loop is closed, the value of the signal on signal line 132 should go to a minimum or near zero value. Pbias is the theoretical bias. It is what the output for the system will be as a function of the phase and intensity difference angle θ.

The second set of equations below show how the expression for Pbias was developed for the topology of FIGS. 3 and 4 using a 3×3 coupler, and with an absolute rate input Ω=10 degrees/second.

$$\epsilon = 0.40 \quad (2\text{-}1)$$

Intensity modulation fraction or modulation depth $$\phi 0 = \pi/10 \quad (2\text{-}2)$$

AC phase mod (radians)

$$f = 1000 \text{ Hz} \quad (2\text{-}3)$$

Frequency of Intensity Modulation and Phase Modulation $$\theta = 0.50975 \cdot \pi \quad (2\text{-}4)$$

Relative phase between the Intensity Modulation and the Phase Modulation when adjusted to null out the error value given below for rate input of equation (2-10).

$$I0 = 2.0 \quad (2\text{-}5)$$

Launch intensity of the light source $$I1(t) = I0 \cdot (1 + \epsilon \cdot \sin(2 \cdot \pi \cdot f \cdot t)) \quad (2\text{-}6)$$

Intensity mod function $$\phi sh(t) = \phi 0 \cdot \sin(2 \cdot \pi \cdot f \cdot t + \theta) \quad (2\text{-}7)$$

AC Phase Modulation Function $$\tau = 0.25 \cdot 10^{-6} \text{ seconds} \quad (2\text{-}8)$$

$$SSF = 0.1 \cdot 10^{-6} \text{ rad/deg/hr} \quad (2\text{-}9)$$

Transit time & Sagnac Scale Factor for an approximately 50-meter coil $$\Omega = 10 \text{ deg/sec} \quad (2\text{-}10)$$

real input rotation rate $$\phi s = \Omega \cdot 3600 \cdot SSF \quad (2\text{-}11)$$

radians Resulting phase shift $$\phi(t) = \phi s + \phi sh(t) \quad (2\text{-}12)$$

$$A = 1 \quad (2\text{-}13)$$

$$B = 1 \quad (2\text{-}14)$$

$$c = 1 \quad (2\text{-}15)$$

3×3 coupler coupling coefficients $$Ia(t) = I1(t) \cdot \frac{((C + A \cdot \sin(\phi(t)) + B \cdot \cos(\phi(t)) - 1)}{6} \quad (2\text{-}16)$$

Phase difference to intensity transfer function for interferometer cw wave $$Ib(t) = I1(t) \cdot \frac{((C - A \cdot \sin(\phi(t)) + B \cdot \cos(\phi(t)) - 1)}{6} \quad (2\text{-}17)$$

Phase difference to intensity transfer function for interferometer ccw wave $$t1 = 0, 0.1 \cdot 10^{-6} \; 1/f \cdot \sec \quad (2\text{-}18)$$

MathCad time array for plotting functions vs. time $$Ida(t) = Ia(t) \cdot I1(t) \quad (2\text{-}19)$$

Intensity 'a' demodulated using intensity mod drive $$Idb(t) = Ib(t) \cdot I1(t) \quad (2\text{-}20)$$

Intensity 'b' demodulated using intensity mod drive $$m = \frac{1}{f \cdot \tau} \quad (2\text{-}21)$$

Number of τ periods in one sine-wave cycle $$Iac = \frac{\sqrt{\frac{2*\int_0^{m*\tau}(II(t)-I0)^2 dt}{m*\tau}}}{I0} \quad (2\text{-}22)$$

pk-pk of intensity mod signal (equiv to ac voltmeter pk-pk) divided by the dc part of the intensity $$Error1 = \int_0^{m*\tau} Ida(t)dt \quad (2\text{-}23)$$

$$Error2 = \int_0^{m*\tau} Idb(t)dt \quad (2\text{-}24)$$

$$\text{Error1}-\text{Error2}=\text{Error}; \quad (2\text{-}25)$$

Adjust θ to drive Error to a minimum $$P\text{bias}=\phi 0 * Iac * \cos(\theta) \quad (2\text{-}26)$$

$$\frac{P\text{bias}}{SSF*3600*1.0679} = 10.010675 \text{ deg/sec Predicted bias} \quad (2\text{-}27)$$

The embodiments of FIGS. 3 and 4 use a 3×3 coupler and as explained in U.S. Pat. No. 4,440,498 to Sang K. Sheem, which issued on Apr. 3, 1984 for an "Optical Fiber Gyroscope With (3×3) Directional Coupler", the contents of which are incorporated herein by reference in their entirety. Sheem observes at column 1, lines 35–40 that such gyros have maximum sensitivity "at a zero rate input and thus does not need the λ/2 nonreciprocal phase bias" provided for by the transit time modulator in FIGS. 1 and 2.

The open-loop output for the gyro topologies of FIGS. 3 and 4 is:

$$Y=\text{Input Rotation Rate}=\arcsin[(S1-S2)/(A*S3)]/SSF \quad (2\text{-}28)$$

where: S1, S2 and S3 are the average dc signals at 250, 140 and 245 respectively and A is a coefficient that is determined empirically by testing. As in the case of the IFOG of FIGS. 1 and 2, the SSF is determined from the geometry and physical characteristics of the interferometer's fiber optic coil 40.

For closed-loop operation, using low frequency Intensity and Phase Modulation signals, the difference between the amplitude of the output of PSD 110 and the demodulated output from PSD 256 is calculated or determined and driven to a minimum by adjusting θ, the phase between the outputs of the phase modulator 94 and the intensity modulator 74. When the difference between the outputs the PSDs is minimized:

$$P\text{bias}2=Y=\psi 0 * Iac * \cos(\theta)$$

where:

ψ0 is the low frequency phase modulation amount in radians,

Iac is the peak-to-peak ac amplitude of the signals measured at 245 divided by the dc amplitude measured at the same point, and θ (theta) is the phase angle between the phase modulation signal and the intensity modulation signal out of the phase modulated signal generator 94 and the intensity modulated signal generator 74.

The invention of FIGS. 1 and 2 was tested using a combination of a fiber optic gyro, laboratory test equipment and math modeling techniques. Software using the AFORTH language, which supported the interfaces to hardware such as the HP signal generators, used for the phase modulated signal generator 94, the intensity modulated signal generator 74 and digitizing samplers 136,244 were used. In a later exercise, a program was written in the QUICK BASIC language, which closed the control loop around a simulated fiber optic gyro.

While the invention has been explained in connection with a several embodiments, it is intended that only the appended claims be used to limit the scope of this patent.

We claim:

1. A phase and intensity modulated IFOG comprising:

a light source responsive to an intensity modulation signal for providing an intensity modulated light signal;

a Sagnac interferometer having a fiber optic coil having a first and a second end, said fiber optic coil receiving and circulating a cw (clockwise) and a ccw (counter clockwise) beam, the coil having a sensitive axis, the Sagnac interferometer being responsive to the intensity modulated light signal at a first input port, and a phase modulation signal at a phase modulation input terminal, for outputting a non-reciprocal interference signal;

a PSD detector system responsive to said non-reciprocal interference signal for providing a demodulated bias signal;

an intensity signal generator having an output providing said intensity modulation signal, a phase signal generator providing said phase modulation signal to said phase modulation input terminal, the intensity signal generator and the phase signal generator having a common frequency, the phase difference θ between the phase modulation signal and the intensity modulation signal being adjustable in response to at least a first computer control signal, a computer having a digitizing sampler coupled to receive and digitize successive sample values of the demodulated bias signal, the computer executing a program characterized to adjust at least said first computer control signal to adjust the phase difference θ between the intensity modulation signal and the phase modulation signal to drive the amplitude of the sample values of the demodulated bias signals to a minimum, the computer program successively calculating and outputting an input rotation rate to the Sagnac sensitive axis as a function of the phase angle between the intensity modulation signal and the phase modulation signal.

2. The phase and intensity modulated IFOG of claim 1 wherein the Sagnac interferometer, further comprises:

an optical coupler responsive to said intensity modulated light signal at a first port, said optical coupler having a second port for sourcing said intensity modulated light signal, and for receiving an optical non-reciprocal interference signal and an output port for sourcing a portion of said non-reciprocal interference signal, and an MIOC (multifunction integrated optics circuit) having an input port coupled to said optical coupler second port, an input wave-guide coupled to said input port, extending to a junction and bifurcating into at least a first and a second output wave-guide, said first and second output wave-guides being coupled to said fiber optic coil first and a second end for launching respective cw and ccw beams and for receiving respective ccw and cw beams, and electrode means coupled to the phase modulation input terminal, the electrode means being responsive to the phase modulation signal for phase modulating launched and received cw and ccw beams, said junction destructively combining said received cw and ccw beams to form said non-reciprocal interference signal and for outputting said non-reciprocal interference signal at said MIOC input port to said optical coupler second port;

said PSD system further comprising a detector coupled to said optical coupler output port to receive said portion of non-reciprocal interference signal and for converting said optical non-reciprocal interference signal into a buffered composite error signal; and, a PSD detector for synchronously detecting said buffered composite error signal and for providing said demodulated bias signal.

3. The phase and intensity modulated IFOG of claim 1 wherein the Sagnac interferometer, further comprises:

a transit time signal generator providing a transit time modulation signal having a frequency equal to half the reciprocal of the transit time of the coil, and an adder for adding the transit time modulation signal and the phase modulation signal to provide a composite phase modulation signal to said phase modulation input terminal, said phase modulation input terminal being responsive to said composite phase modulation signal for modulating launched and received cw and ccw beams.

4. The phase and intensity modulated IFOG of claim 1 wherein the Sagnac interferometer, further comprises:

a transit time signal generator providing a transit time modulation signal having a frequency functionally related to half the reciprocal of the transit time of the coil, and an adder for adding the transit time modulation signal and the phase modulation signal to provide a composite phase modulation signal; and, wherein the PSD detector system further comprises a filter having an input responsive to the buffered composite error signal and for outputting a filtered buffered composite error signal, the PSD being responsive to the transit time modulation signal and the filtered buffered composite error signal for synchronously demodulating the filtered buffered composite error signal to provide the demodulated bias signal.

5. A phase and intensity modulated IFOG comprising:

a light source responsive to an intensity modulation signal for providing an intensity modulated light signal;

a Sagnac interferometer having, a fiber optic coil having a first and a second end, said fiber optic coil receiving and circulating a cw (clockwise) and a ccw (counter clockwise) beam, the coil having a sensitive axis, an optical coupler responsive to said intensity modulated light signal at a first port, said optical coupler having a second port for sourcing said intensity modulated light signal and for receiving an non-reciprocal interference signal and an output port for sourcing a portion of said non-reciprocal interference signal, an MIOC (multifunction integrated optics circuit) having, an input port, and first and second output ports coupled to said fiber optic coil respective first and second ends, an electrode means responsive to a phase modulation signal for modulating launched and received cw and ccw beams within said MIOC, and outputting said non-reciprocal interference signal to said optical coupler second port;

a PSD system having a detector system coupled to said optical coupler output port to receive said a portion of said non-reciprocal interference signal and for converting said non-reciprocal interference signal into a buffered composite error signal, and wherein said PSD system further comprises:

an LPF (low pass filter) is responsive to said buffered composite error signal for providing a buffered and filtered composite error signal, and a PSD for demodulating the non-reciprocal interference signal to provide a demodulated bias signal;

an intensity signal generator having an output providing said intensity modulation signal, a phase signal generator providing said phase modulation signal to said MIOC electrode means, the intensity signal generator and the phase signal generator having a common frequency, the phase difference $\theta$ between the phase modulation signal and the intensity modulation signal being adjustable in response to at least a first computer control signal, a computer having a digitizing sampler coupled to receive and digitize successive sample values of the demodulated bias signal, the computer executing a program characterized to adjust at least said first computer control signal to adjust the phase difference $\theta$ between the intensity modulation signal and the phase modulation signal to drive the amplitude of the sample values of the demodulated bias signals to a minimum, the computer program successively calculating and outputting an input rotation rate to the Sagnac sensitive axis as a function of the phase angle between the intensity modulation signal and the phase modulation signal.

6. The phase and intensity modulated IFOG of claim 5 wherein the Sagnac interferometer, further comprises:

a transit time signal generator providing a transit time modulation signal having a frequency equal to half the reciprocal of the transit time of the coil, and an adder for adding the transit time modulation signal and the phase modulation signal to provide a composite phase modulation signal, the composite phase modulation signal being coupled to said electrode means for modulating launched and received cw and ccw beams.

7. The phase and intensity modulated IFOG of claim 5 wherein the Sagnac interferometer, further comprises:

a transit time signal generator providing a transit time modulation signal having a frequency equal to half the reciprocal of the transit time of the coil, and an adder for adding the transit time modulation signal and the phase modulation signal to provide a composite phase modulation signal, the composite phase modulation signal being coupled to said electrode means for modulating launched and received cw and ccw beams; and, wherein the PSD detector system is coupled to and driven by the transit time modulation signal for the synchronous demodulation of the buffered composite error signal.

8. The phase and intensity modulated IFOG of claim 5 wherein the intensity modulated light source is an ELED or an SLD or other type of laser light source capable of being intensity modulated at a multi-kilohertz rate.

9. The phase and intensity modulated IFOG of claim 1 wherein the Sagnac interferometer further comprises a 3×3 coupler having first, second and third, fourth and fifth output ports, and an input port, said input port being coupled to receive said intensity modulated light, said intensity modulated light being divided into first, second and third portions by the 3×3 coupler and output from the 3×3 coupler's first, second and third output ports, the first and second output ports being coupled to respective fiber optic coil first and second ends to launch cw and ccw beams and receive respective ccw and cw non-reciprocal interference signals, and wherein said PSD detector system responsive to said non-reciprocal interference signal for providing a demodulated bias signal, further comprises:

at least a first detector and pre-amplifier and second detector and pre-amplifier, the first detector and pre-amplifier being coupled to the 3×3 coupler's fourth output port to be responsive to said cw non-reciprocal interference signal for providing a first buffered composite error signal and the second detector and pre-amplifier being coupled to the 3×3 coupler's fifth output port be responsive to said ccw non-reciprocal interference signal for providing a second buffered composite error signal, each detector and pre-amplifier also providing a respective filtered composite error signal.

10. The phase and intensity modulated IFOG of claim 9 further comprising: a modulating means responsive to said phase modulation signal for modulating said launched and received cw and ccw beams, said 3×3 coupler destructively combining said received ccw and cw beams to form first and second non-reciprocal interference signals and for outputting a portion of said first and second non-reciprocal interference signal from said third and fourth output ports.

11. The phase and intensity modulated IFOG of claim 10 wherein said modulation means further comprises a PZT fiber optic coil modulator having an input terminal responsive to said phase modulation signal for modulating said cw (clockwise) and a ccw (counter clockwise) beams.

12. The phase and intensity modulated IFOG of claim 9, wherein said PSD detector system responsive to said non-reciprocal interference signal for providing a demodulated bias signal, further comprises:

a first LPF (low-pass filter) responsive to said first buffered composite error signal for providing a first buffered and filtered composite error signal, and a first PSD (phase sensitive detector) responsive to said first buffered and filtered composite error signal for providing a first demodulated bias signal, and a second LPF (low-pass filter) responsive to said second buffered composite error signal for providing a second buffered and filtered composite error signal, and a second PSD (phase sensitive detector) responsive to said second buffered and filtered composite error signal for providing a second demodulated bias signal;

and wherein the digitizing sampler is coupled to receive and periodically digitize each first and second demodulated bias signal each first and second filtered composite error signal, and couple their respective values to the computer.

13. The phase and intensity modulated IFOG of claim 9, further comprising: a third detector and pre-amplifier, the third detector and pre-amplifier being coupled to said 3×3 coupler third output port to sample the intensity of the intensity modulated light source and provide a third filtered composite error signal, and wherein the digitizing sampler is coupled to receive and periodically digitize the third filtered composite error signal and provide a series of digitized third filtered composite error signals to the computer.

14. The phase and intensity modulated IFOG of claim 9, wherein the computer program further comprises the step of adjusting the angle θ to minimize the value of the difference between the first and second demodulated bias signals followed by the step of calculating the angular rate being sensed by the Sagnac Interferometer by calculating the value of Pbias from the equation:

$$Pbias = 0.5 * \phi 0 * \epsilon * \cos(\theta) \text{ radians}$$

where $\phi 0$ and $\epsilon$ are known constants and by then substituting the value obtained for Pbias into the following equation to solves for the calculated IFOG sensed rate input:

$$\frac{Pbias}{SSF * 3600 * 1.0125} = \text{sensed rate input in deg/sec}$$

where SSF is a known constant.

15. A phase and intensity modulated IFOG comprising:

a light source having an input responsive to an intensity modulation signal for providing an intensity modulated light signal;

a Sagnac interferometer having, a fiber optic coil having a first and a second end, said fiber optic coil receiving and circulating a cw (clockwise) and a ccw (counter clockwise) beam, the coil having a sensitive axis, a 3×3 coupler having a first, second, third, fourth and fifth output ports, and an input port, said input port being coupled to receive said intensity modulated light, said intensity modulated light being divided by said 3×3 coupler into first, second and third portions and output from said 3×3 coupler's first, second and third output ports, the first and second output ports being coupled to respective fiber optic coil first and second ends to launch cw and ccw beams and receive respective ccw and cw non-reciprocal interference signals, a detector system coupled to said optical coupler's fifth and sixth output ports to receive said ccw and cw non-reciprocal interference signals and for converting said non-reciprocal interference signals into a first and second buffered composite error signals;

a PSD detector coupled to detect, amplify, and demodulate said first and second buffered composite error signals and provide a first and a second demodulated bias signal;

a first and second digitizing sampler coupled to receive and digitize successive sample values of the first and second demodulated bias signals, and to provide digitized first and second demodulated bias signals, an intensity signal generator for providing said intensity modulation signal, a phase signal generator for providing a phase modulation signal, and wherein said Sagnac interferometer further comprises:

a modulating means responsive to said phase modulation signal for modulating said launched and received cw and ccw beams, said 3×3 coupler destructively combining said received ccw and cw beams to form said first and second non-reciprocal interference signals and for outputting a portion of said first and second non-reciprocal interference signal at said fourth and fifth output ports, the intensity signal generator and the phase signal generator having a common frequency, the phase difference θ between the phase modulation signal and the intensity modulation signal being adjustable in response to at least a first computer control signal;

a computer executing a computer program, the computer having an input port coupled to receive said successive digitized first and second demodulated bias signals, the program being characterized to adjust at least said first computer control signal to automatically adjust the phase difference θ between the intensity modulation signal and the phase modulation signal drive the amplitude of the difference between the digitized first and second demodulated bias signals to a minimum, the computer program calculating and outputting an input rotation rate to the sensitive axis as a function of the phase angle between the intensity modulation signal and the phase modulation signal.

16. The phase and intensity modulated IFOG of claim 15 wherein said modulation means further comprises a PZT fiber optic coil modulator having an input terminal responsive to said phase modulation signal for modulating said cw (clockwise) and a ccw (counter clockwise) beams.

17. The phase and intensity modulated IFOG of claim 15, wherein said PSD detector system responsive to said non-reciprocal interference signal for providing a demodulated bias signal, further comprises:

a first LPF (low-pass filter) responsive to said first buffered composite error signal for providing a first buffered and filtered composite error signal, and a first PSD (phase sensitive detector) responsive to said first buffered and filtered composite error signal for providing a first demodulated bias signal, and a second LPF (low-pass filter) responsive to said second buffered composite error signal for providing a second buffered and filtered composite error signal, and a second PSD (phase sensitive detector) responsive to said second buffered and filtered composite error signal for providing a second demodulated bias signal;

and wherein the digitizing sampler is coupled to receive and periodically digitize each first and second buffered and filtered composite error signal and each first and second filtered composite error signal, and couple their respective values to the computer.

18. The phase and intensity modulated IFOG of claim 15, further comprising: a third detector and pre-amplifier, the third detector and pre-amplifier being coupled to said 3×3 coupler third output port to sample the intensity of the intensity modulated light source and provide a third filtered composite error signal, and wherein the digitizing sampler is coupled to receive and periodically digitize the third filtered composite error signal and provide a series of digitized third filtered composite error signals to the computer.

19. The phase and intensity modulated IFOG of claim 15, wherein the computer program further comprises the step of adjusting the angle θ to minimize the value of the difference between the first and second demodulated bias signals followed by the step of calculating the angular rate being sensed by the Sagnac Interferometer by calculating the value of Pbias from the equation:

$$P\text{bias} = 0.5 * \phi 0 * \epsilon * \cos(\theta) \text{radians}$$

where $\phi 0$ and $\epsilon$ are known constants and by then substituting the value obtained for Pbias into the following equation to solves for the calculated IFOG sensed rate input:

$$\frac{P\text{bias}}{SSF * 3600 * 1.0125} = \text{sensed rate input in deg/sec}$$

where SSF is a known constant.

* * * * *